United States Patent [19]

McClure

[11] Patent Number: 4,507,831

[45] Date of Patent: Apr. 2, 1985

[54] SPRING CLIP FOR TILTER WORM SHAFT

[75] Inventor: David K. McClure, Muncy, Pa.

[73] Assignee: Marathon Manufacturing Company, Houston, Tex.

[21] Appl. No.: 443,579

[22] Filed: Nov. 22, 1982

[51] Int. Cl.³ ............................................. A44B 13/00
[52] U.S. Cl. ...................................... 24/590; 24/236;
 24/573; 160/177; 160/178 R; 403/209;
 403/287; 403/301
[58] Field of Search ............ 24/230.5, 241 R, 241 SP,
 24/233, 293, 296, 573, 598, 599, 618, 687, 236,
 237, 241 S, 241 PL, 590, 591, 600, 614, 615, 698,
 699; 464/147, 148, 182; 403/57, 209, 213, 287,
 301; 160/166 R, 166 A, 176 R, 177, 178 R

[56] References Cited

U.S. PATENT DOCUMENTS

| | | | |
|---|---|---|---|
| 1,208,692 | 12/1916 | Storm | 24/598 X |
| 1,389,173 | 8/1921 | Watkins | 24/599 |
| 1,500,475 | 7/1924 | Tyson | 24/687 X |
| 3,253,846 | 5/1966 | Garcia | 403/301 |
| 3,425,479 | 2/1969 | Lorentzen et al. | 160/176 R |
| 3,445,901 | 5/1969 | Kamper | 24/618 |
| 3,533,139 | 10/1970 | Gomes et al. | 24/230.5 |
| 3,845,578 | 11/1974 | Holmstrom | 403/287 X |
| 4,064,604 | 12/1977 | Hartman | 403/209 X |
| 4,293,021 | 10/1981 | Arena | 160/178 R |

FOREIGN PATENT DOCUMENTS

| | | | |
|---|---|---|---|
| 76066 | 4/1919 | Austria | 24/573 |
| 2729225 | 1/1979 | Fed. Rep. of Germany | 160/178 R |
| 2803469 | 8/1979 | Fed. Rep. of Germany | 160/176 R |
| 1504934 | 12/1967 | France | 403/213 |

*Primary Examiner*—William E. Lyddane
*Assistant Examiner*—James R. Brittain
*Attorney, Agent, or Firm*—Robert K. Youtie

[57] ABSTRACT

A spring clip shaft connection wherein a shaft includes a transverse hole spaced inwardly from one end of the shaft, a generally U-shaped body having a leg formed with longitudinally extending proximate and distal leg portions laterally offset from each other by an intermediate leg portion, and an arm extending from the body longitudinally of the leg, the leg being insertable through the hole for location of the intermediate leg portion in the hole with the distal and proximate leg portions on opposite sides of the shaft, and the arm being resiliently snap engaged into a recess in the leg.

8 Claims, 6 Drawing Figures

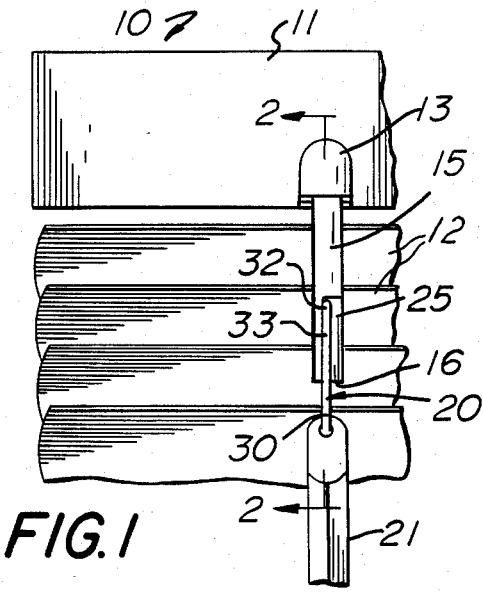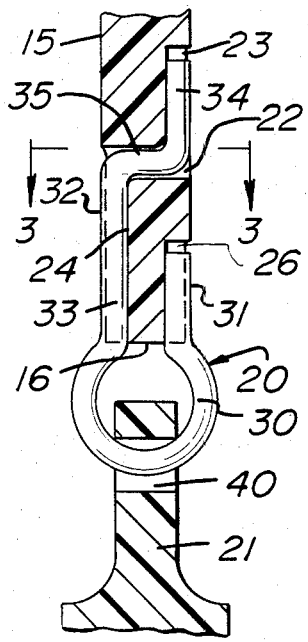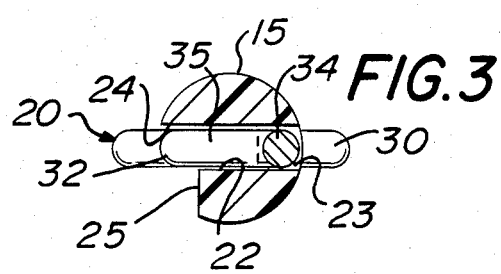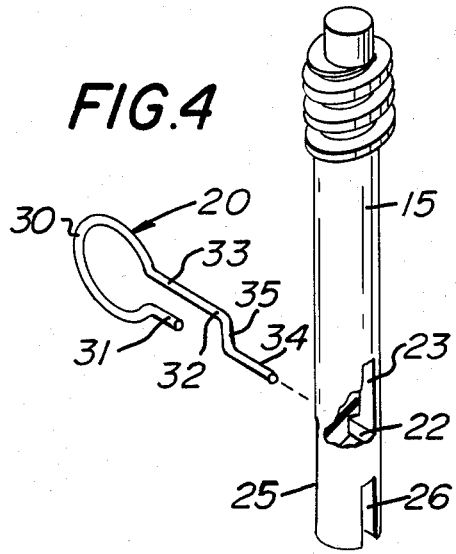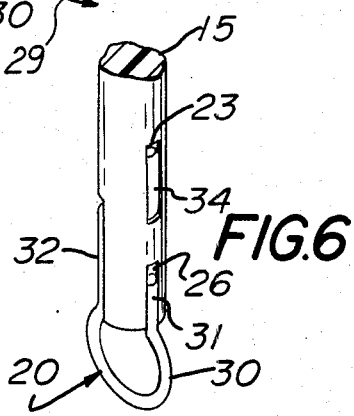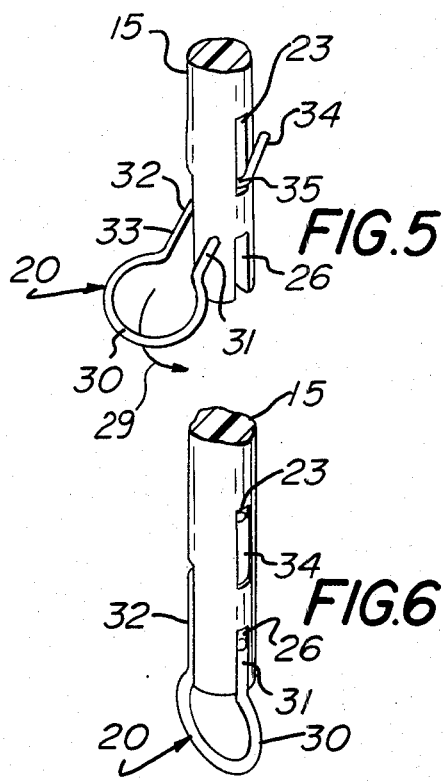

SPRING CLIP FOR TILTER WORM SHAFT

BACKGROUND OF THE INVENTION

In the current art of venetian blind manufacture, the practice is to provide a worm-and-wheel tilter mechanism including a manually rotatable wand swingably conencted to a worm shaft, such as shown in prior U.S. Pat. Nos. 3,425,479; 3,828,838 and 4,141,402. However, the rod-shaft connections of the prior art were not entirely satisfactory, often being unduly expensive to manufacture, difficult to assemble, and subject to inadvertent disassembly in use.

The prior U.S. Pat. No. 3,425,479 to Lorentzen et al requires a shiftable sleeve 40, while the Marotto U.S. Pat. No. 4,141,402 requires relatively expensive dies. Also, it is well known to employ a clevis, suitably secured by a screw, or the like.

SUMMARY OF THE INVENTION

In accordance with the instant invention it is an important object to provide a tilter wand connection which is extremely simple in construction for effecting substantial economy in manufacture and assembly, entirely reliable and durable throughout a long useful life under substantially all possible conditions of use, which is heat and attractive in appearance, and permits of deliberate disassembly without undesired separation of parts.

While the structure of the present invention has been primarily developed and employed for use in a blind tilter wand assembly, and is illustrated and described hereinafter with particular reference thereto, it is appreciated that the device is capable of many varied applications, all of which are intended to be comprehended herein.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the slope will be indicated by the appended claims.

BRIEF DESCRIPTION OF THE DRAWINGS

FIG. 1 is a partial elevational view showing a venetian blind including a tilter wand connection constructed in accordance with the teachings of the present invention.

FIG. 2 is a partial sectional elevational view taken generally along the line 2—2 of FIG. 1.

FIG. 3 is a transverse sectional view taken generally along the line 3—3 of FIG. 2.

FIG. 4 is an exploded perspective view partly broken away for clarity, and illustrating an initial stage in assembly of the instant connection.

FIG. 5 is a perspective view showing a spring clip of the present invention in an intermediate stage of assembly with a tilter shaft.

FIG. 6 is a perspective view showing the instant spring clip fully assembled with the tilter shaft, a wand being omitted from FIGS. 4–6 for clarity of illustration.

DESCRIPTION OF THE PREFERRED EMBODIMENT

Referring now more particularly to the drawings, and specifically to FIG. 1 thereof, a venetian blind is there generally designated 10, including a generally horizontally extending headrail 11, and a plurality of slats 12 extending horizontally below the headrail. A tilter assembly 13 is located in the headrail 11, and includes a tilter worm shaft 15 projecting outwardly and downwardly from the headrail and terminating in a shaft end 16.

A connector or clip of the present invention is generally designated 20 and projects from the shaft 15 beyond the shaft end 16 for connection to a manual actuation member, rod or wand 21.

In particular, the shaft 15 may be generally cylindrical, as shown, and may have a diametral through bore or hole 22 extending transversely through and opening on opposite sides of the shaft at a location spaced inwardly from the shaft end 16.

From one end of the shaft hole or passageway 22, on one side of the rod or shaft 15, (the right side as seen in FIG. 2), there extends a longitudinal recess or groove 23. That is, the elongate recess or groove 23 extends from one end of the hole or passageway 22, communicating therewith, longitudinally of the shaft 15 in the inward direction of the shaft, away from the shaft end 16. The recess 23 opens radially outwardly from the shaft 15 throughout the length of the recess.

On the opposite side of the shaft 15, extending from the other end of transverse passageway or hole 22 is an elongate recess or groove 24 extending longitudinally of the shaft toward and opening through the shaft end 16. The recess or groove 24 is thus parallel to the groove or recess 23, being offset from the latter both longitudinally and laterally.

The groove 24, in addition to opening radially outwardly of the shaft 15, throughout the length of the groove, opens laterally throughout its length to define on the shaft a partially chordal flat 25, see FIGS. 1 and 3. The flat 25 is a flush, lateral extension of the bottom wall of groove 24 and intersects at its outer end with the surface of shaft end 16.

An additional recess 26 is formed in the outer surface of shaft 15, extending longitudinally thereof, in spaced, end-to-end alignment with the recess or groove 23. That is, the external recess or groove 26 is spaced longitudinally outwardly from the groove 23, being in general alignment therewith, and opens both radially outwardly from the shaft 15 and longitudinally outwardly through the surface of the shaft end 16.

The spring clip 20 may be integrally fabricated of spring wire or rod stock and bent to define an open loop, eye or U-shaped body 30. From one end of the U-shaped body or loop 30 there may extend a generally straight stub or arm 31 of a length approximating or slightly less than that of the recess or groove 26.

From the other end of the U-shaped body or eye 30, generally longitudinally of the arm 31, may extend a relatively elongate element or leg 32. The leg 32 is specifically configured to define in the region adjacent to the body 30 a substantially straight proximate leg portion 33, spaced laterally from and generally parallel to the arm 31. The proximate leg portion 33 is longer than and extends longitudinally outward beyond the end of arm 31. The distal end portion 34 of leg 32 is laterally offset from the proximate leg portion 33 and connected to the latter by an intermediate leg portion 35 extending generally normal to and between the adjacent ends of proximate and distal leg portions 33 and 34.

That is, the portions 33, 34 and 35 of leg 32 may be generally coplanar, with the distal and proximate leg portions 34 and 33 generally parallel to and laterally offset from each other. Further, the distal leg portion 34 may be in general alignment with and longitudinally outwardly spaced from the arm 31.

The distal leg portion 34 is of a length slightly less than that of groove 23 for reception of the distal leg portion in the groove 23. Similarly, the intermediate leg portion 35 is sized for insertion through and reception in the transverse through hole of passageway 22, while the proximate leg portion 33 is of a length for location in groove 24.

Thus, in the assembled condition of FIG. 2, the leg 32 has its portions 33, 35 and 34 respectively received in groove 24, bore 22 and groove 23; while arm 31 is received in groove 26. The generally U-shaped body 30 may pass through an eye or opening 40 in wand or actuating member 21 for effective securement of the latter to the shaft 15, while permitting of substantially universal relative movement therebetween. That is, neither by pull or tension on the wand 21, nor by rotation thereof (within reasonable limits) may the wand 21 be separated from the shaft 15.

The assembly procedure is shown in FIGS. 4–6, where it will be seen that the leg 32 is first inserted through rod hole 22 and swung to the position of FIG. 5. Thereafter, the clip 20 is twisted or turned relative to the shaft 15, in the direction of arrow 29, to ride the proximate leg portion 32 laterally across the flat surface 25 and snap the arm 31 into groove 26. This assembly is enabled by the resilient resistance to spreading afforded by the arm 31 and leg 32. The fully assembled condition of FIG. 6 is thereby assumed. Of course, the wand 21 would be assembled with the clip 20 prior to assembly of the clip with the shaft 15.

While reasonable tensile and rotational forces exerted on the clip 20 will not disassemble the latter from the shaft 15, a deliberate rotation of the clip relative to the shaft 15, generally about the axis of transverse intermediate shaft portion 35 in the direction opposite to arrow 29, will cause the proximate leg portion 33 to ride outwardly across flat surface 25 and resilient outward spreading of arm 31 to snap the arm out of groove 26. Return swinging movement of the clip 20 in the direction of arrow 29 generally about the axis of its intermediate shaft portion 35 will restore the clip to its fully assembled condition. As such relative movement between the clip 20 and shaft 15 would not occur in actual use, the connection is highly reliable in operation.

From the foregoing, it is seen that the present invention provides a spring clip connection for a venetian blind tilter wand which is extremely simple in construction and method of assembly, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A spring clip connection comprising a shaft terminating outwardly in a shaft end, said shaft having a transverse through hole spaced inwardly from said shaft end, a body for connection to said shaft, a leg extending from said body, said leg having a proximate leg portion adjacent to said body and a distal leg portion remote from said body and offset laterally from said proximate leg portion, said leg having a transverse intermediate leg portion extending between adjacent regions of said distal and proximate leg portions, said leg being sized for insertion through said hole to locate said transverse intermediate leg portion rotatably in said hole with said distal and proximate leg portions on opposite sides of said shaft, and an arm extending from said body longitudinally of and spaced laterally from said proximate leg portion for location on the opposite side of said shaft as said proximate leg portion, said shaft having elongate recesses extending in opposite directions from opposite ends of said hole for respectively receiving said distal and proximate leg portions longitudinally in said recesses when said intermediate leg portion is in said hole, and said leg and arm being resiliently displaceable away from each other for snap engagement into said recesses and firm resilient clamping engagement with said shaft on angular displacement of said leg and arm about the axis of said intermediate portion on rotation of the latter in said hole.

2. A connection according to claim 1, said shaft having an additional recess for receiving said arm.

3. A connection according to claim 1 said recess for receiving said proximate leg portion being open laterally to facilitate receiving said proximate leg portion.

4. A connection according to claim 3, said shaft having an additional recess extending longitudinally inwardly from said shaft end for conformably receiving said arm and further resisting said angular displacement about the axis of said intermediate leg portion.

5. A connection according to claim 1, said distal and proximate leg portions being generally parallel to and longitudinally offset from each other.

6. A connection according to claim 5, said arm being generally parallel to said distal and proximate leg portions.

7. A connection according to claim 6, said arm being generally aligned with and longitudinally spaced from said distal leg portion.

8. A connection according to claim 1, said body comprising a resilient loop having its opposite ends integral with said arm and proximate leg portion, for affording said resilient displaceability.

* * * * *